(No Model.) 4 Sheets—Sheet 2.
L. J. R. HOLST.
MAGAZINE CAMERA.

No. 578,639. Patented Mar. 9, 1897.

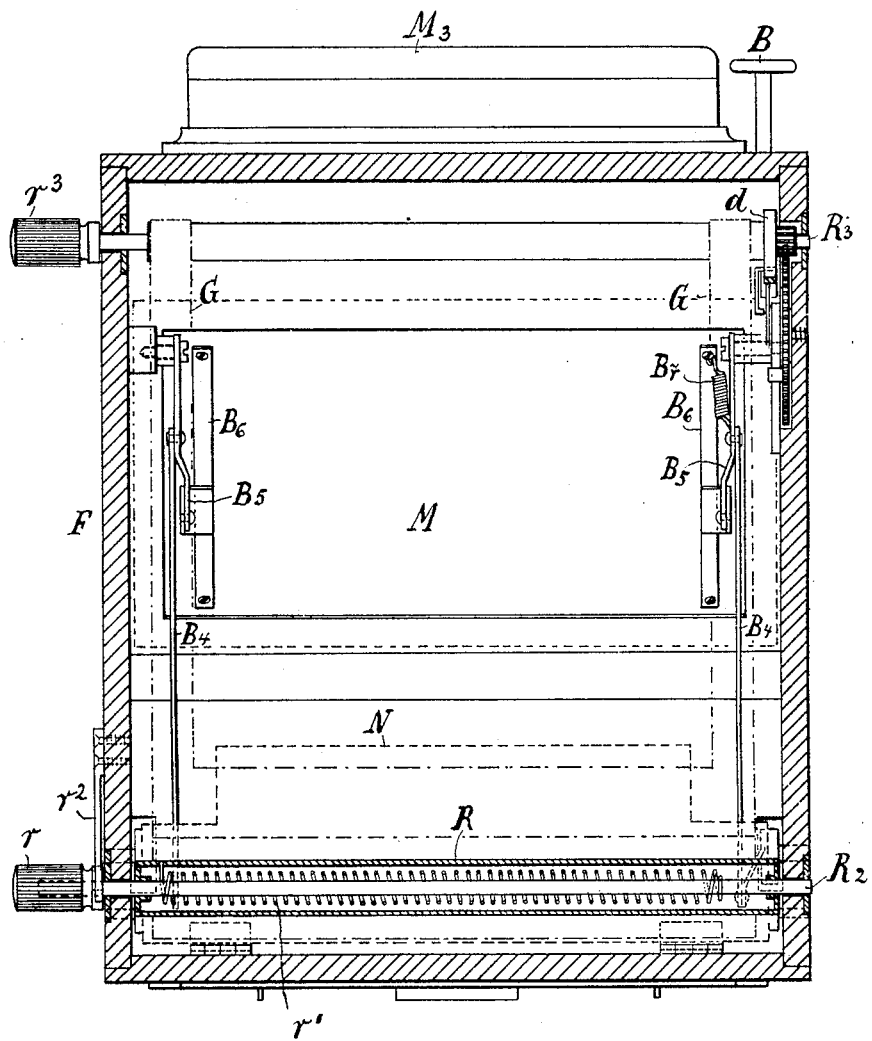

(No Model.) 4 Sheets—Sheet 4.
L. J. R. HOLST.
MAGAZINE CAMERA.
No. 578,639. Patented Mar. 9, 1897.
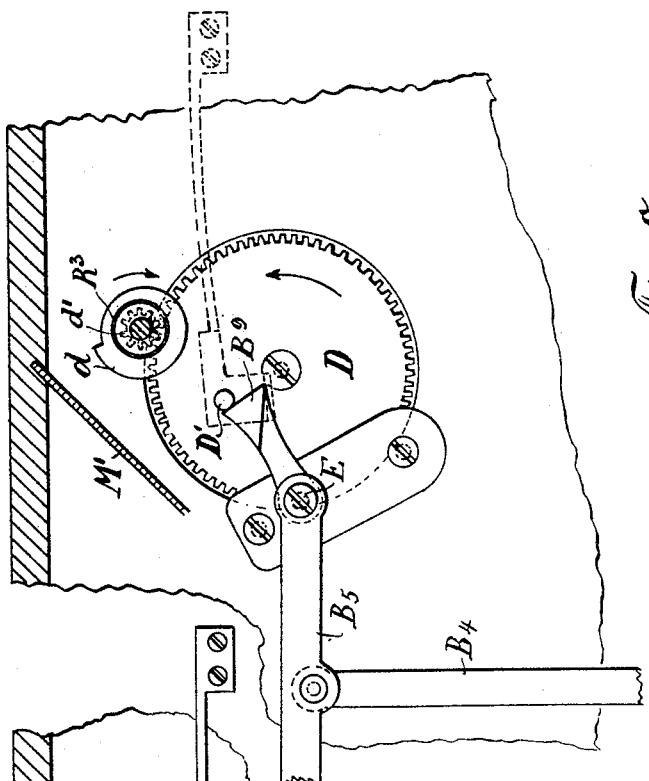
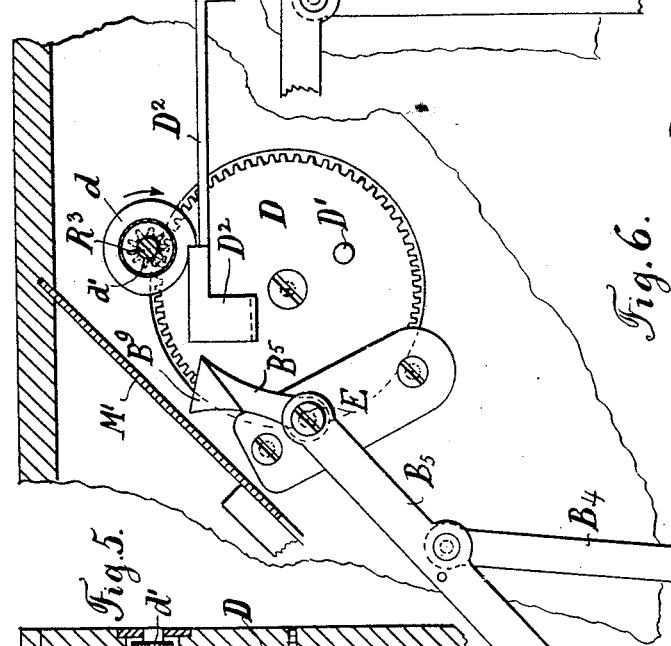
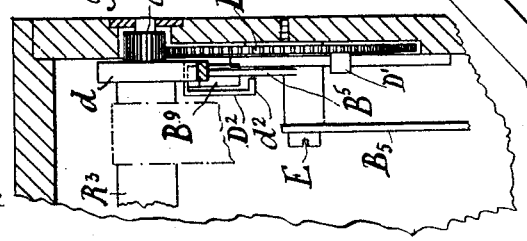
Witnesses:
S. C. Connor
L. Wenke
Inventor
Lodewyk J. R. Holst
By his Attorneys
Howson & Howson

UNITED STATES PATENT OFFICE.

LODEWYK JAN RUTGER HOLST, OF AMSTERDAM, NETHERLANDS.

MAGAZINE-CAMERA.

SPECIFICATION forming part of Letters Patent No. 578,639, dated March 9, 1897.

Application filed February 4, 1896. Serial No. 578,014. (No model.) Patented in France March 27, 1895, No. 246,150.

*To all whom it may concern:*

Be it known that I, LODEWYK JAN RUTGER HOLST, a subject of the Queen of the Netherlands, and a resident of Amsterdam, Holland, have invented certain Improvements in Photographic Cameras, (for which Letters Patent have been obtained in France, No. 246,150, dated March 27, 1895,) of which the following is a specification.

This invention relates to cameras which are adapted to carry a series of sensitized plates in a change box or magazine.

To enable my invention to be fully understood, I will describe the same by reference to the accompanying drawings, in which—

Figure 1:
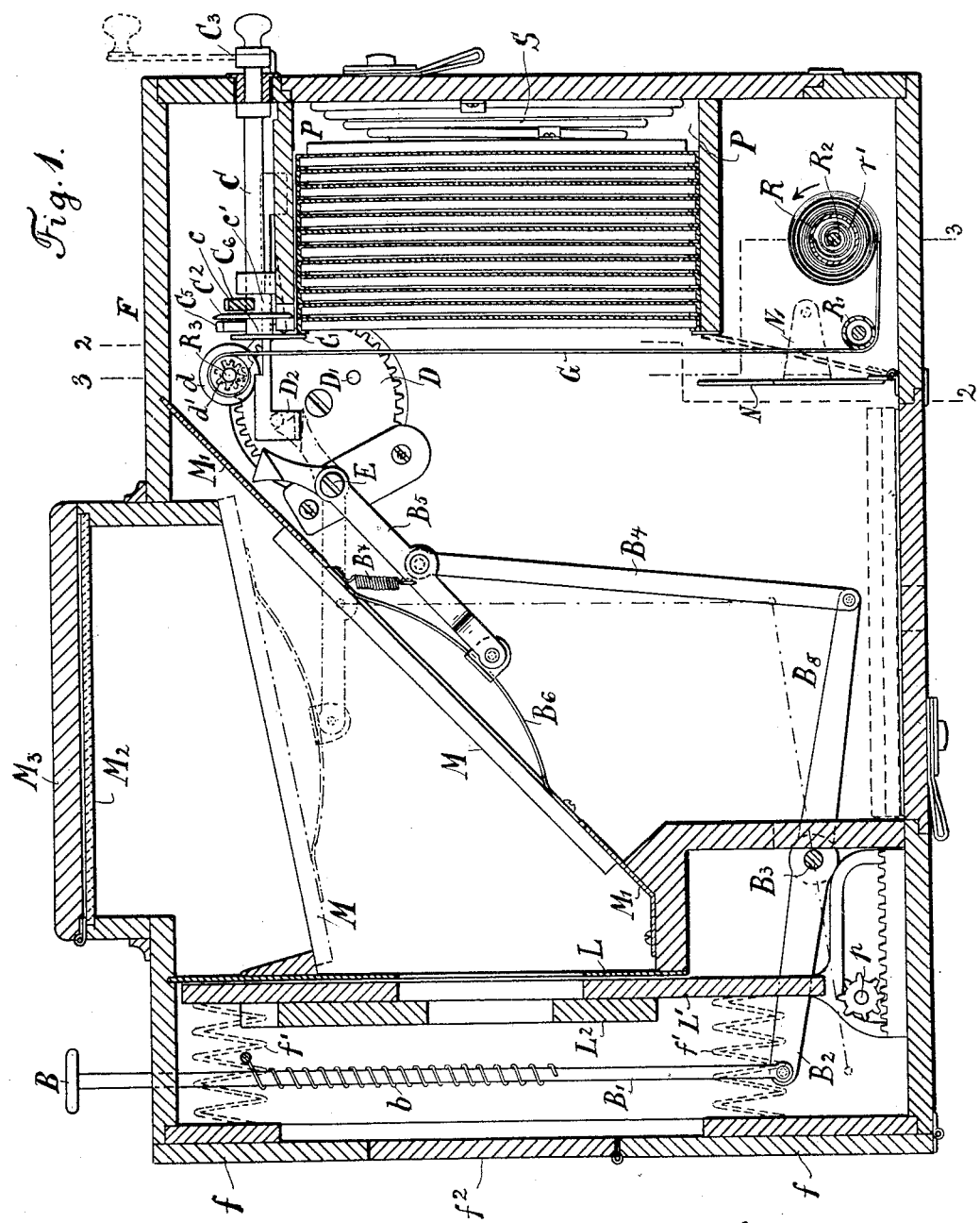
Figure 2:
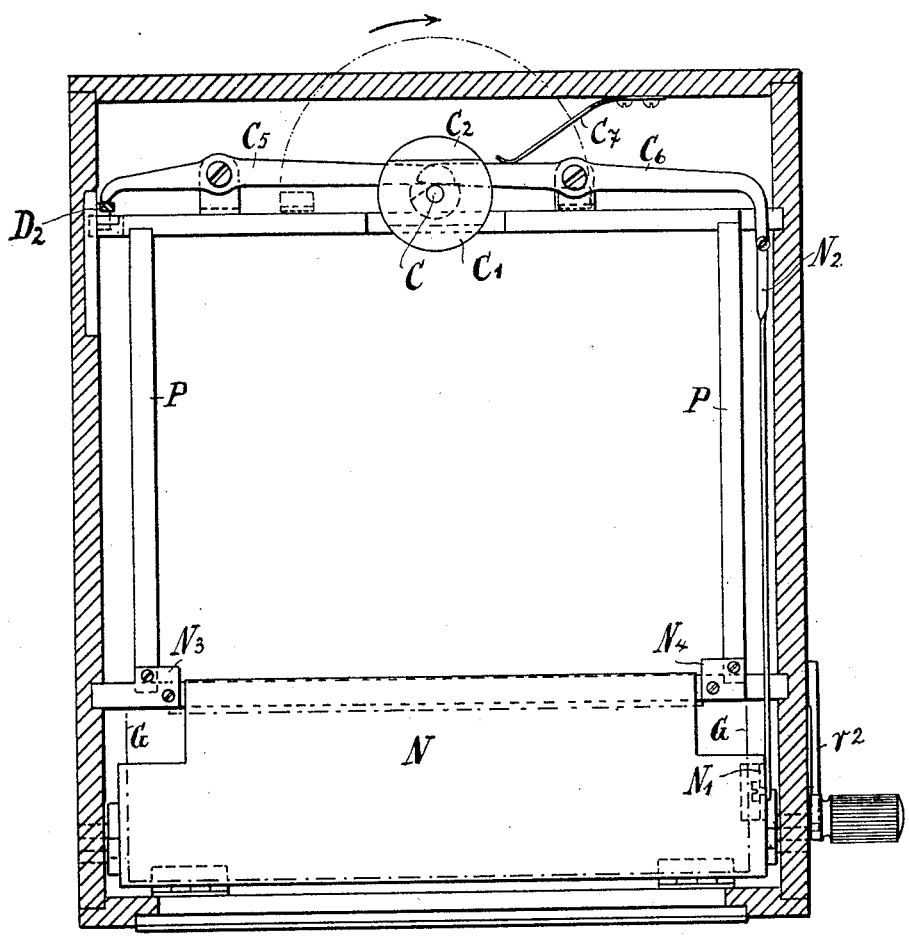

Figure 1 is a longitudinal section of a camera made according to my invention; Fig. 2, a cross-section of the same on the line 2 2 of Fig. 1, looking toward the back of the camera. Fig. 3 is a cross-section on the line 3 3 of Fig. 1, looking toward the front of the camera. Fig. 4 is, on a larger scale, a side elevation of the locking mechanism of the shutter in the first locked position. Fig. 5 is a front elevation of the same. Fig. 6 is a plan of the same. Figs. 7 and 8 show the mechanism in side elevation and plan in the second locked position.

In divided or mirror cameras as heretofore constructed the mirror was placed with its upper edge so near to the back of the camera that its front edge could not strike against the lens-board when it was rotated upward on its upper edge as a pivot for the purpose of an exposure. With such an arrangement, however, it is impossible to provide the camera with a magazine in which the plates are tilted, as the exposed plate when tipped forward on its lower edge would strike against the mirror with its upper edge, thereby preventing further movement on the part of the plate. When, however, the mirror is placed so far forward that the exposed plate can be tipped forward behind it, the said mirror cannot be rotated on its upper edge, as in this case it would strike against the lens-board. For this reason a particular lifting arrangement is required, by means of which the mirror can be pressed against the upper focusing-screen of the camera in such a manner that it does not hinder the tilting of the plate nor strike against the lens-board. To this end, therefore, I cause the mirror to be raised and lowered by means of levers arranged laterally in the camera and having their pivots behind the said mirror. This arrangement of levers serves also to operate the shutter situated directly in front of the plate to be exposed.

According to my invention I divide the camera F into two parts by an inclined partition M', arranged between the objective and the magazine and parallel to the line bisecting the angle made by the exposed plate and the ground-glass focusing-screen $M^2$, arranged on the top of the camera. This angle is generally ninety degrees, but it may be greater or less. The distance of the partition M' from the said bisecting-line is such that the surface of a mirror M, attached to the said partition and reflecting the rays of light therefrom, is exactly in the said bisecting-line.

The objective is arranged in any suitable manner in the camera in front of the partition M' and may be focused by any convenient means, but preferably by a movable partition L', operated by a rack and pinion $p$, and connected to the front $f$ of the camera by a leather bellows $f'$, to prevent light penetrating into the camera. The objective may be mounted upon a slide $L^2$, adjustable upon the partition L'. The front of the camera is in the drawing shown closed by a hinged door $f^2$. The ground-glass screen $M^2$ is fitted to a projecting part of the camera in such a position that a vertical line through its center meets the mirror M at the same point as the optical axis of the objective. The length of this vertical line is equal to the distance of the point of intersection of the vertical line and the optical axis from the plate to be exposed. A hinged cover $M^3$ is arranged over the ground-glass screen $M^2$, to prevent the same from being too strongly illuminated.

The partition M' is provided with an opening of such size and shape that the plate behind the same, foremost in the magazine, is fully exposed to the light-rays when the mirror is raised from the partition.

Two springs $B^6 B^6$ are attached to the back of the mirror M near the edges of the opening in the partition, the said springs being connected to two levers $B^5 B^5$. These levers are suitably pivoted on pins E, fastened to the frame or casing of the camera. Two links $B^4$ $B^4$ are connected at their upper ends to the levers $B^5$ $B^5$ and at their lower ends to levers $B^8$, which are fixed to a rotatable spindle $B^3$, passing through the sides of the camera. An arm $B^2$, forming a continuation of one of the levers $B^8$, is pivoted to a vertical rod $B'$, Fig. 1, which passes through the top of the camera and is provided at its upper end with a knob or button B. A spiral pull-spring $b$, wound on the vertical rod $B'$ and connected at its lower end to the rod and at its upper end to the casing, tends to pull the rod continually upward. Between the upper part of the mirror and the bent lever $B^5$, I arrange a small spring $B^7$, which tends to draw the mirror toward the said lever $B^5$.

The shutter is a flexible band G, placed directly in front of the plate to be exposed and designed to be wound on two rollers R and $R^3$ and to pass over the guide-roller $R'$, interposed between the two rollers R and $R^3$. This band G is provided with two openings, the upper of which is sufficiently large to allow of the passage therethrough of the frames containing the sensitized plates or films. The other opening is sufficiently large to effect the instantaneous exposure of the plates and is at such a distance from the first-mentioned opening that the part of the band between the two openings will completely cover the plate. The band is sufficiently long below the second opening to permit of the part containing this opening being wound on the upper roller.

The lower roller R is placed underneath the magazine or plate-box P and is free to rotate on the spindle $R^2$, one end of which passes through the side of the camera and is provided with a knob or button $r$. On this spindle $R^2$, I fit a helical spring $r'$, one end of which is fastened to the spindle and the other end to the roller R, so as to tend to turn the latter in the direction of the arrow shown in Fig. 1. The spindle $R^2$ is provided with a ratchet-and-pawl arrangement $r^2$ to prevent it from rotating backward. The upper roller $R^3$, to which the upper end of the shutter-band is fastened, also projects through the side of the camera and is provided with a knob or button $r^3$ to enable the band to be wound on the roller. The said roller is also provided in the interior of the camera with a disk $d$, having a single tooth which engages with a spring-pawl $D^2$, carried by a part of the frame or casing of the camera. This pawl is provided with a downwardly-projecting arm, the lower extremity of which is bent outward, so that it forms a flange $d^2$ and can be pressed downward by the enlarged head $B^9$ of the free end of the lever $B^5$. A small toothed wheel $d'$ is mounted on the upper roller $R^3$ between the said toothed disk and the side of the roller, and gears in a toothed wheel D, provided with a laterally-projecting pin $D'$. This pin is so arranged that the disk can rotate freely when the band G is being wound on the upper roller $R^3$. The toothed wheel D has at least six times as many teeth as the wheel $d'$ on the roller $R^3$, which gears with it.

The mechanism for changing the plates is operated by a shaft or spindle C, which passes through the magazine in the direction of the length of the camera, the end of the shaft which projects through the camera being provided with a handle $C^3$. The front end of this shaft C is provided with two approximately semicircular plates or disks $C'$ and $C^2$, arranged to act like the pallets of an escapement. The frame which contains the foremost sensitized plate presses against the back of the front disk $C'$, the said frame lying with its bottom edge against two stops $N^3$ and $N^4$, Fig. 2, which are fixed to the bottom of the plate-box. The rear semicircular disk $C^2$, which projects in a direction opposite to that of the front disk $C'$, is separated from the latter by a distance equal to the width of a plate-frame, and it is also somewhat tapered at the end, so that it can easily pass between the two front frames. When this disk $C^2$ is turned fully downward, it relieves the front plate from the pressure of the spring arranged at the back of the plate-box to force the plates outward, the front plate being at the same time released from the front disk $C'$.

As seen in Fig. 2, two levers $C^5$ and $C^6$ are arranged transversely across the plate-magazine. The inner end of the lever $C^5$ rests on an eccentric $c$, fixed to the shaft C between the two disks $C'$ and $C^2$, while its other end is bent downward and rests on the spring-pawl $D^2$ when the latter engages in the toothed disk. The inner end of the lever $C^6$ also rests on an eccentric $c'$ on the shaft C, which eccentric is so shaped that when the said shaft is rotated through the first ninety degrees by means of the handle $C^3$ the lever $C^6$ does not move, but when the handle is further rotated the inner end of the lever is raised, so that the arm $N'$ of the plate N is turned backward, thereby assuming the position shown by the dotted lines in Fig. 1, by means of the rod $N^2$, which is fixed to the outer arm of the lever and to the arm $N'$ of the plate N. A spring $C^7$, arranged to bear upon the lever $C^6$, tends to keep the latter always in contact with the eccentric.

The operation of the apparatus is as follows: For instantaneous photography the knob of the roller $R^3$ is turned until the whole of the free length of the shutter-band G is wound up on the same and the lower unperforated part of the shutter completely covers the sensitized plate. During the winding up of the shutter first the larger and then the smaller opening passes in front of the plate, which, however, is not acted upon by the light-rays, as the mirror M completely closes the opening in the partition $M'$. The winding of the shutter-band G on the roller R causes the spring $r'$ of the roller R to be wound up, so that when the shutter is released it is again wound on the roller R by the action of the said spring. The tension of the spring can be regulated as desired by means of the knob r and pawl-and-ratchet arrangement $r^2$ on the spindle $R^2$. By pressing down the button B the mirror M, lying on the partition M', is raised and assumes the position shown in the dotted lines in Fig. 1. The mirror then completely closes the opening in the top of the camera and leaves the opening in the partition M' free for the passage of the light-rays. On further pressing the knob B the springs $B^6$ are compressed. The short arm of the lever $B^5$, which engages with the flange $d^2$ of the spring-pawl $D^2$ when the mirror is shifted to its upper position, presses the said pawl $D^2$ downward, so that it releases the toothed disk d on the roller $R^3$, thereby releasing the shutter, which is then wound up on the roller R by the action of the spring r' on the same. The toothed wheel d' on the roller $R^3$ simultaneously causes the toothed wheel D to rotate until the pin D' on the side of the latter comes in contact with the inner edge of the enlarged head of the shorter arm of the lever $B^5$, Fig. 7. The movement of the shutter is then stopped in such a position that the unperforated part of the band between the two openings is directly in front of the exposed plate. The exposure is now finished and by relieving the button B of pressure the mirror M is allowed to drop onto the partition M', thereby covering the opening of the same. As soon as the springs $B^6$ on the release of the button B press on the lever $B^5$ the latter releases the pawl $D^2$, which again engages with the toothed disk on the roller $R^3$. As the lever $B^5$ must go still farther before it is released by the pin D', it is evident that the pawl engages with the ratchet-wheel before the pin D' is set free. When the mirror drops onto the partition, the shutter remains in the position which it assumed after the exposure.

In order to change the plates, the shaft C is turned half-way around by means of the handle $C^3$ in the direction of the arrow shown in Fig. 2. The shorter arm of the lever $C^5$ thereby presses the pawl $D^2$ downward, so that the shutter-band is again set free, but as the mirror is in its lower position and the lever $B^5$ in its inoperative position the toothed wheel D meets with no resistance, so that the shutter is not prevented from unwinding until the large opening is situated in front of the plate. As soon as the handle $C^3$ begins the second half of its revolution the plate N is turned downward by means of the lever $C^6$ and the rod $N^2$, as hereinbefore explained, until its upper edge lies against the lower edge of the plate-box. The rotation of the handle $C^3$ causes the front disk C' on the shaft C to release the exposed plate while the edge of the rear disk $C^2$ passes between the first and second plates. The front exposed plate is then only held at its lower edge by the two stops $N^3$ and $N^4$ and is tipped forward into the bottom of the apparatus on tilting the camera. The handle $C^3$ is then returned to its original position, whereby the plate N again assumes its vertical position, the spring-pawl $D^2$ is set free by the lever $C^5$ and again engages in the toothed disk on the roller $R^3$, and the rear disk $C^2$ at the same time sets free the second plate, which is then pressed forward against the back of the front disk C' by means of the spring S at the back of the plate-box, so that the second plate is ready for exposure.

When it is desired to operate by time exposure, it is only necessary to give the handle $C^3$ a half-turn, so that the shutter is freed and completely unrolled from the roller $R^3$, whereby the large opening registers with the exposed plate, and then to raise the mirror M from the opening in the partition M' by depressing the button B. The exposed plate is then tipped forward in the manner hereinbefore described.

I claim as my invention—

1. A divided or mirror camera provided with means for tipping forward the exposed plates on their lower edges, in combination with a pivoted mirror and lateral operating-levers having pivots situated behind the said mirror, whereby the latter can be arranged so near the lens-board that the exposed plate can be tipped forward behind the mirror, substantially as described.

2. A camera having a change-box and pivoted mirror, and a flexible shutter provided with a small opening for instantaneous exposure and with a large opening for time exposure through which latter opening the sensitized plates can be passed in combination with a roller for the shutter, a lever connected with the mirror, a pawl detaining the roller and acted on by said lever, whereby the flexible shutter is rolled up and the narrow opening passes in front of the plate, a wheel actuated by the roller and provided with a pin adapted to come in contact with the said lever to again stop the shutter until the said pawl again engages with the roller when the mirror is lowered, substantially as described.

3. A camera having a change-box, means for changing the plates, and a flexible shutter provided with a small opening for instantaneous exposure and a large opening for time exposure through which latter opening the sensitized plates can be passed, in combination with a roller for the shutter and a pawl detaining the roller and a lever operated by the means for changing the plates and adapted to set free the said pawl before the front plate is released so that the shutter is rolled up farther in order to bring its large opening in front of the plate either for the purpose of time exposure or for changing the exposed plate which is tipped forward through the said opening, substantially as described.

LODEWYK JAN RUTGER HOLST.

Witnesses:
AUGUST SIEGFRIED DOCH,
JOHAN CAREL ZIMMERMAN.